US009293035B2

(12) United States Patent
Adachi

(10) Patent No.: US 9,293,035 B2
(45) Date of Patent: Mar. 22, 2016

(54) INFORMATION APPARATUS, APPARATUS TO BE CONTROLLED, RADIO COMMUNICATION SYSTEM, AND METHOD FOR SELECTING APPARATUS TO BE CONTROLLED

(71) Applicant: Panasonic Corporation, Osaka (JP)

(72) Inventor: Takaaki Adachi, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 13 days.

(21) Appl. No.: 14/396,544

(22) PCT Filed: Mar. 13, 2014

(86) PCT No.: PCT/JP2014/001429
§ 371 (c)(1),
(2) Date: Oct. 23, 2014

(87) PCT Pub. No.: WO2014/141710
PCT Pub. Date: Sep. 18, 2014

(65) Prior Publication Data

US 2015/0116096 A1 Apr. 30, 2015

(30) Foreign Application Priority Data

Mar. 13, 2013 (JP) ................................ 2013-050504

(51) Int. Cl.
*G11B 17/02* (2006.01)
*G08C 17/02* (2006.01)

(52) U.S. Cl.
CPC ............ *G08C 17/02* (2013.01); *G08C 2201/70* (2013.01); *G08C 2201/92* (2013.01); *G08C 2201/93* (2013.01)

(58) Field of Classification Search
CPC ............... G08C 17/02; G08C 2201/92; G08C 2201/70; G08C 2201/93; G06F 13/00
USPC .................................. 340/12.5, 12.51–12.55
See application file for complete search history.

(56) References Cited

U.S. PATENT DOCUMENTS 8,284,061 B1 * 10/2012 Dione ................ G06Q 30/0269 235/383
2006/0206582 A1 * 9/2006 Finn ....................... H04H 60/73 709/217
2014/0089143 A1 * 3/2014 Dione .................... G06Q 30/02 705/26.61

FOREIGN PATENT DOCUMENTS

| | | | |
|---|---|---|---|
| JP | 11-088371 | A | 3/1999 |
| JP | 2002-330483 | A | 11/2002 |
| JP | 2006-109094 | A | 4/2006 |
| JP | 2012-119935 | A | 6/2012 |

OTHER PUBLICATIONS

International Search Report for Application No. PCT/JP2014/001429 dated Jun. 10, 2014.

* cited by examiner

*Primary Examiner* — Allen T Cao
(74) *Attorney, Agent, or Firm* — Pearne & Gordon LLP

(57) ABSTRACT

An information device is disclosed that makes it possible to simplify the operation of a user in selecting a device to be operated from among a plurality of controlled devices without any cost increase. In this device, a reception frequency indicating section instructs a frequency synthesizer to perform demodulation at a first frequency (5 GHz) first. The reception frequency indicating section instructs the frequency synthesizer to perform demodulation at a second frequency (920 MHz) when instructed from a user to select another controlled device while a menu button indicating all the controlled devices whose ID information has been detected is displayed.

8 Claims, 9 Drawing Sheets

INFORMATION APPARATUS, APPARATUS TO BE CONTROLLED, RADIO COMMUNICATION SYSTEM, AND METHOD FOR SELECTING APPARATUS TO BE CONTROLLED

TECHNICAL FIELD

The present invention relates to an information device, a controlled device, a radio communication system and a controlled device selection method.

BACKGROUND ART

In general, controlled devices such as a television and air conditioner are remotely controlled using a specific control device typified by a remote controller provided for the controlled devices.

Today, it is common that each household includes a plurality of controlled devices installed in the house. Meanwhile, it is troublesome for users to operate different control devices to control many controlled devices.

In recent years, since information devices communicable with other devices such as smartphones are widely spread, techniques are being developed which provide information devices with functions of a remote controller so as to allow a user to control a plurality of controlled devices using a single information device. In this case, the user needs to specify controlled devices to be operated by the information device before starting control.

PTL 1 discloses a technique that causes an information device to store beforehand, images of surroundings of each controlled device in association with the controlled device, that causes, when operating a specific controlled device, the information device to capture images of surroundings of the controlled device to be operated so that the information device compares the stored images with the captured images to thereby identify the controlled device to be operated.

CITATION LIST

Patent Literature

PTL 1

Japanese Patent Application Laid-Open No. 2012-119935

SUMMARY OF INVENTION

Technical Problem

However, the prior art described in PTL 1 requires the process of comparing images stored in the information device with the captured images to identify the controlled devices, which leads to an increase in the cost of the information device.

An object of the present invention is to simplify, when controlling a plurality of controlled devices using a single information device, the operation of a user in selecting a device to be operated from among the plurality of controlled devices without any increase in the cost of the information device.

Solution to Problem

An information device according to an aspect of the present invention is an information device that performs radio communication with a plurality of controlled devices and that controls a specified controlled device, the information device including: a parameter indicating section that indicates a radio signal to be demodulated; a radio communication section that receives a plurality of radio signals having different parameters indicative of distance-dependent radio wave characteristics from the respective controlled devices and that demodulates the indicated radio signal; an ID detection section that detects ID information included in the demodulated radio signal; and a display control section that causes the controlled device corresponding to the ID information to be displayed on a screen, in which the parameter indicating section indicates that the radio signals are to be demodulated in descending order of the parameters indicative of the distance-dependent radio wave characteristics.

A controlled device selection method according to an aspect of the present invention is a controlled device selection method in an information device that performs radio communication with a plurality of controlled devices and that controls a specified controlled device, the method including: indicating that radio signals to be demodulated are demodulated in such a way that the radio signals are demodulated in descending order of parameters indicative of distance-dependent radio wave characteristics; receiving a plurality of radio signals having different parameters indicative of distance-dependent radio wave characteristics from the respective controlled devices and demodulating the indicated radio signal; detecting ID information included in the demodulated radio signal; and causing the controlled device corresponding to the ID information to be displayed on a screen.

Advantageous Effects of Invention

According to the present invention, demodulating radio signals in descending order of parameters indicative of distance-dependent radio wave characteristics can simplify, when controlling a plurality of controlled devices using a single information device, the operation of the user in selecting a device to be operated from among the plurality of controlled devices without any increase in the cost of the information device.

DESCRIPTION OF EMBODIMENT

Hereinafter, an embodiment of the present invention will be described in detail with reference to the accompanying drawings. Note that, a description will be given of a case where a smartphone is used as an information device in each embodiment.

Figure 1:
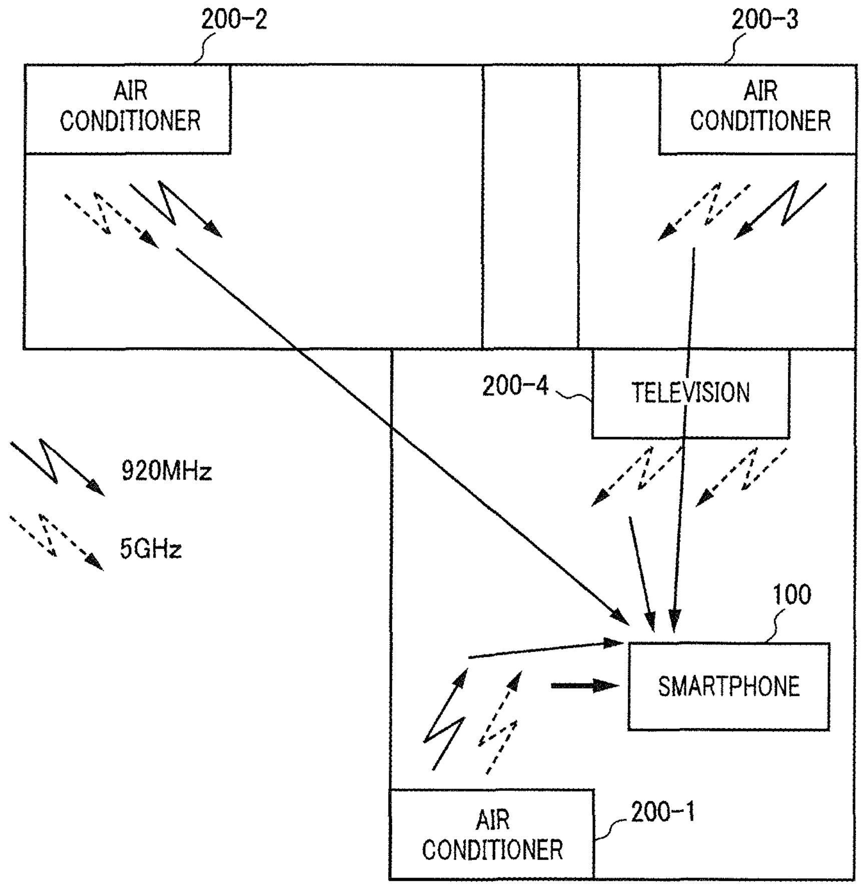
FIG. 1 illustrates a configuration of a radio communication system according to an embodiment of the present invention.

FIG. 1 illustrates a configuration of a radio communication system according to an embodiment of the present invention. As shown in FIG. 1, a radio communication system includes one smartphone 100 and a plurality of controlled devices 200. In the example in FIG. 1, air conditioners (only indoor units are shown) 200-1, 200-2 and 200-3 and television 200-4 are installed in a house as examples of controlled device 200.

In the present embodiment, each controlled device 200 transmits a first signal having a first frequency (e.g., 5 GHz) higher than a predetermined threshold (e.g., 2 GHz) and a second signal having a second frequency (e.g., 920 MHz) lower than the threshold to smartphone 100.

Smartphone 100 identifies controlled device 200 to be an operation target candidate using ID (Identification) information of each controlled device 200 delivered by the first signal and the second signal. Smartphone 100 finally transmits a control signal to operation target controlled device 200 indicated by a user.

Controlled device 200 designated as the operation target performs predetermined processing based on the control signal from smartphone 100. For example, air conditioner 200-1 performs control such as power ON/OFF, switching of an operation mode (heating, cooling, dehumidification), adjustment of wind direction or air volume according to the control signal from smartphone 100 and performs air conditioning operation so that the room temperature becomes a set temperature.

Figure 2:
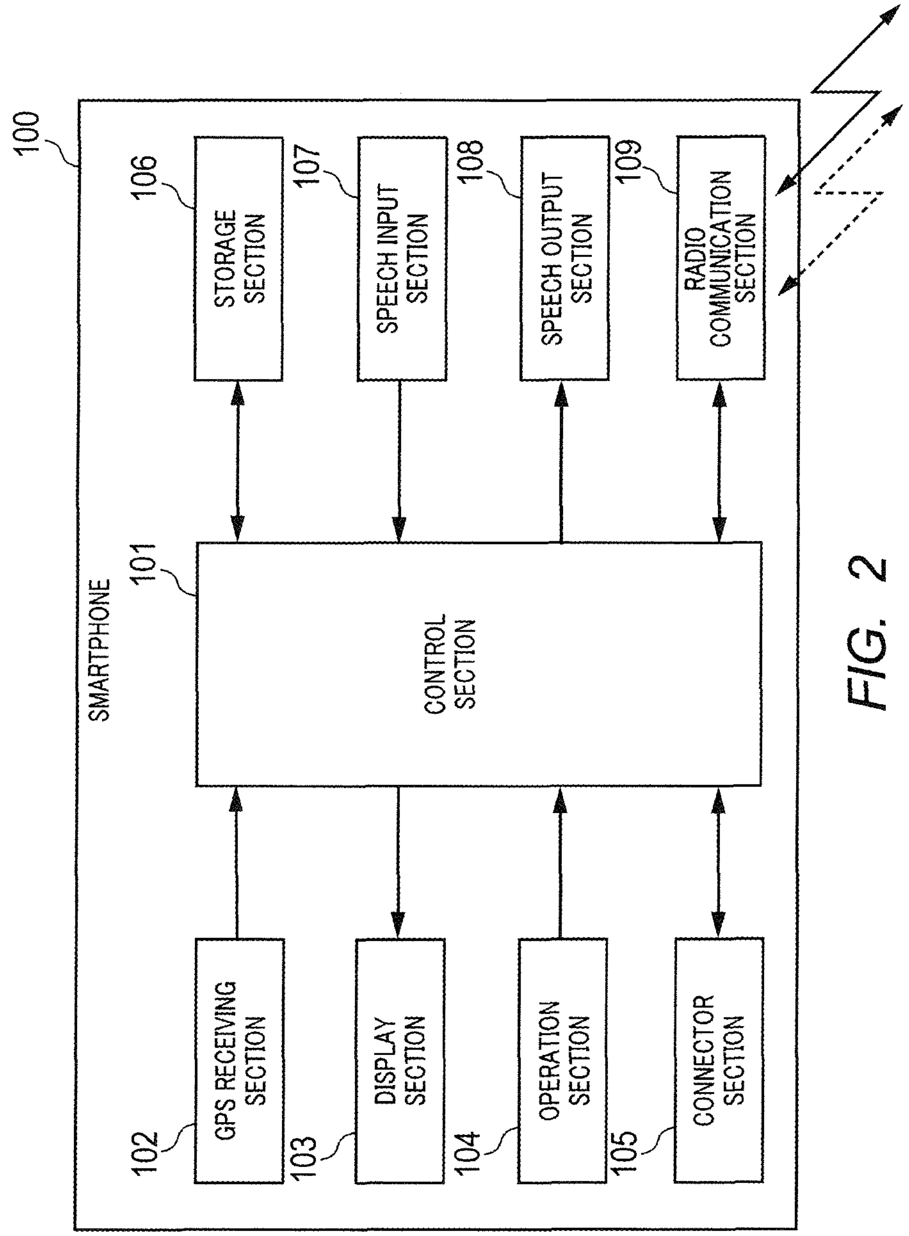
FIG. 2 is a block diagram illustrating a configuration of a smartphone according to the embodiment of the present invention.

FIG. 2 is a block diagram illustrating a configuration of smartphone 100 according to the embodiment of the present invention. Smartphone 100 mainly includes control section 101, GPS receiving section 102, display section 103, operation section 104, connector section 105, storage section 106, speech input section 107, speech output section 108, and radio communication section 109.

Control section 101 includes an information processing apparatus such as a CPU (Central Processing Unit) or MPU (Micro-Processor Unit), reads and executes an application program stored beforehand in storage section 106, and thereby performs various kinds of processing such as processing relating to speech communication and processing relating to transmission/reception of e-mail. In addition, control section 101 identifies controlled device 200 which becomes an operation target candidate using ID information of each controlled device 200 delivered by the first signal and the second signal received by radio communication section 109. Details of the functions of control section 101 according to the present invention will be described later.

GPS (Global Positioning System) receiving section 102 receives a GPS signal transmitted from a plurality of GPS satellites and outputs the received information to control section 101. Control section 101 performs processing of identifying the position (latitude and longitude or the like) of smartphone 100 based on the GPS signal received at GPS receiving section 102.

Display section 103 is a liquid crystal panel or PDP (Plasma Display Panel) in a small size of approximately 2 to 5 inches and displays an image based on an image signal outputted from control section 101. This allows smartphone 100 to cause display section 103 to display a menu or icon for operation aid, e-mail to be transmitted/received, or map images for a route guide using a car navigation function.

Operation section 104 is a touch panel that detects contact operation on a display panel of display section 103 or a push switch, dial switch or the like provided on a case of smartphone 100, and coverts an instruction from the user to an electric signal and outputs the signal to control section 101.

Connector section 105 has a plurality of terminals for connections with other devices and is electrically connected with the other devices via mating with the plurality of terminals provided for cable connectors connected to the other devices. Connector section 105 transmits information outputted from control section 101 to the other devices and also outputs information received from the other devices to control section 101.

Storage section 106 includes a flash memory or hard disk or the like. Storage section 106 stores beforehand, an application program to be executed by control section 101 and data necessary to execute the application program.

Speech input section 107 is a so-called microphone and converts speech from the user to an electric signal and outputs the signal to control section 101. Speech output section 108 is a so-called speaker and converts an electric signal outputted from control section 101 to speech and outputs the speech.

Radio communication section 109 performs radio communication via a public radio communication network such as a mobile phone network or public wireless LAN. Moreover, radio communication section 109 performs radio communication with controlled device 200. Details of the internal configuration of radio communication section 109 according to the present invention will be described later.

Figure 3:
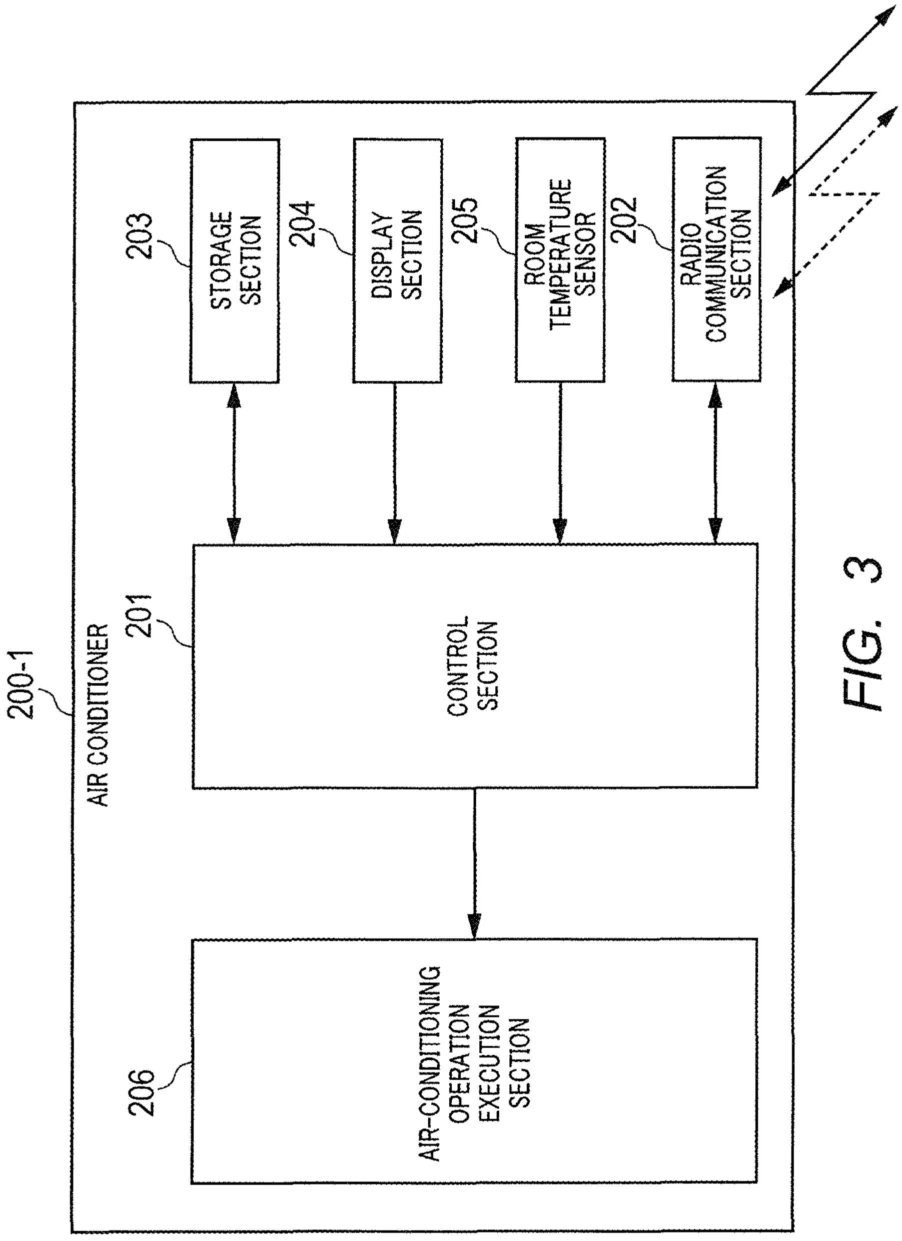
FIG. 3 is a block diagram illustrating a configuration of an air conditioner according to the embodiment of the present invention.

FIG. 3 is a block diagram illustrating a configuration of air conditioner 200-1, which is an example of controlled device 200 according to the present embodiment. Air conditioner 200-1 includes an indoor unit and an outdoor unit, and FIG. 3 illustrates only the indoor unit. Air conditioner 200-1 mainly includes control section 201, radio communication section 202, storage section 203, display section 204, room temperature sensor 205, and air-conditioning operation execution section 206.

Control section 201 causes storage section 203 to store an operation mode and a set temperature indicated by a control signal from smartphone 100 and causes display section 204 to display the operation mode or set temperature. Control section 201 causes air-conditioning operation execution section 206 to perform air-conditioning operation according to the operation mode so that the room temperature detected by room temperature sensor 205 becomes the set temperature. Control section 201 outputs ID information of air-conditioner 200-1 to radio communication section 202.

Radio communication section 202 receives a control signal with a radio frequency transmitted from smartphone 100, converts the signal to a baseband signal and outputs the converted signal to control section 201. Furthermore, radio communication section 202 transmits ID information using the first signal and the second signal to smartphone 100.

Storage section 203 is a ROM (Read-Only Memory) or RAM (Random Access Memory) and stores a program to be executed by control section 201 and data or the like to be processed by control section 201.

Display section 204 displays a room temperature, set temperature and operation mode. Room temperature sensor 205 detects a room temperature all the time.

Air-conditioning operation execution section 206 includes a heat exchanger, blower fan motor, stepping motor or the like, adjusts wind direction, air volume based on an instruction from control section 201 and performs air-conditioning operation so that the room temperature becomes a set temperature.

Next, details of the functions of control section 101 and details of the internal configuration of radio communication section 109 according to the present invention will be described with reference to FIG. 4.

Figure 4:
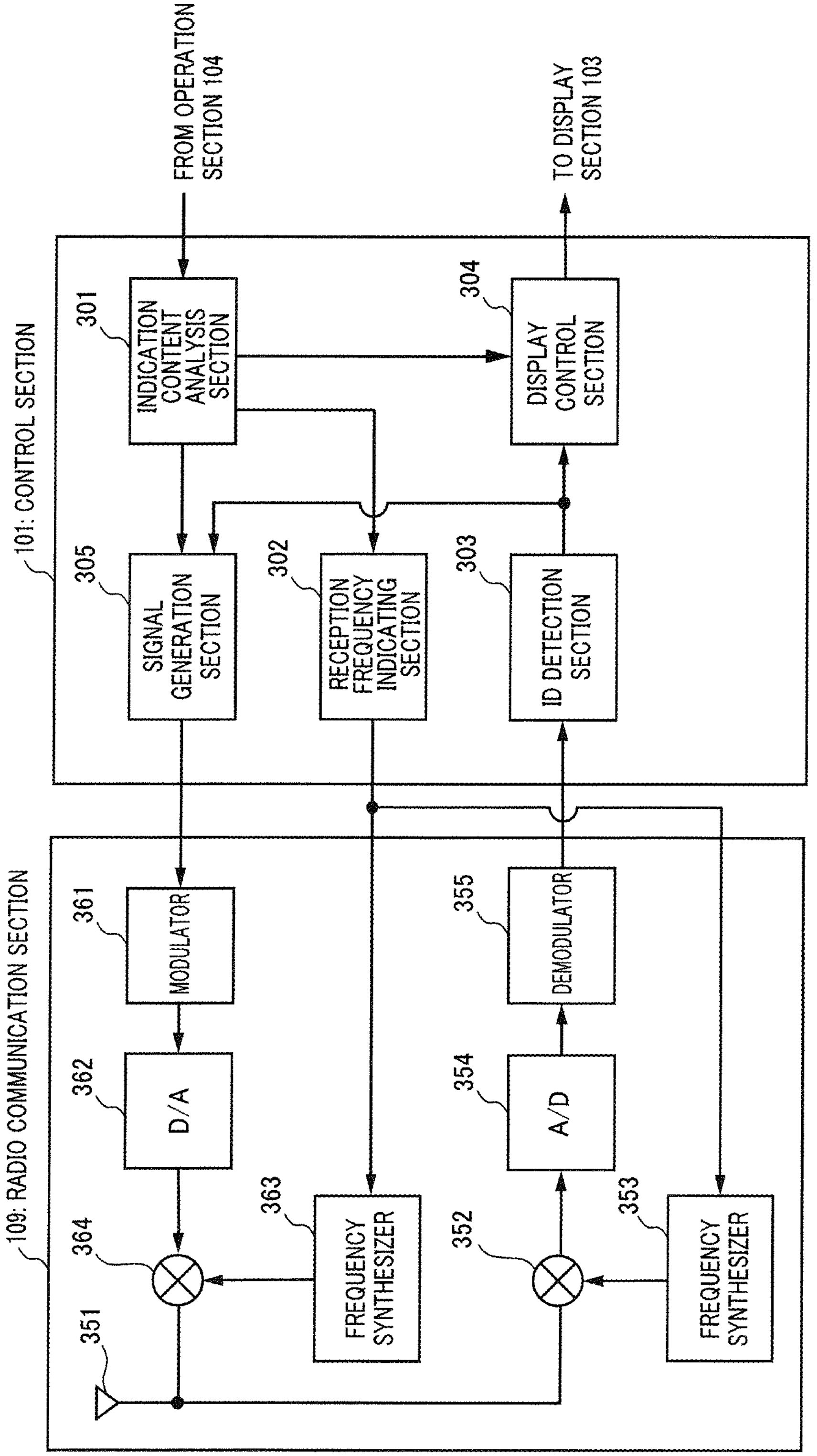
FIG. 4 is a block diagram illustrating functions of a control section and an internal configuration of a radio communication section of the smartphone according to the embodiment of the present invention.

As shown in FIG. 4, control section 101 includes indication content analysis section 301, reception frequency indicating section 302, ID detection section 303, display control section 304 and signal generation section 305. Radio communication section 109 includes antenna 351, mixer 352, frequency synthesizer 353, A/D converter (analog/digital converter) 354, and demodulator 355. Radio communication section 109 also includes modulator 361, D/A converter (digital/analog converter) 362, frequency synthesizer 363, and mixer 364.

Indication content analysis section 301 analyzes the indication content of the user from an electric signal outputted from operation section 104. When the electric signal is a signal requesting control of controlled device 200, indication content analysis section 301 outputs the electric signal to reception frequency indicating section 302. When the electric signal specifies one of controlled devices 200, indication content analysis section 301 outputs the electric signal to display control section 304. When the electric signal indicates an indication content to control operation target controlled device 200, indication content analysis section 301 outputs the electric signal to signal generation section 305.

Upon receiving a first electric signal requesting control of controlled device 200 from indication content analysis section 301, reception frequency indicating section 302 instructs frequency synthesizer 353 of radio communication section 109 to demodulate the signal at a first frequency. Upon receiving a second electric signal requesting control of controlled device 200 from indication content analysis section 301, reception frequency indicating section 302 instructs frequency synthesizers 353 and 363 of radio communication section 109 to demodulate the signal at a second frequency.

ID detection section 303 detects ID information of controlled device 200 from the output signal of demodulator 355 of radio communication section 109 and outputs information indicating controlled device 200 corresponding to the ID information to display control section 304 and signal generation section 305.

Figure 5:
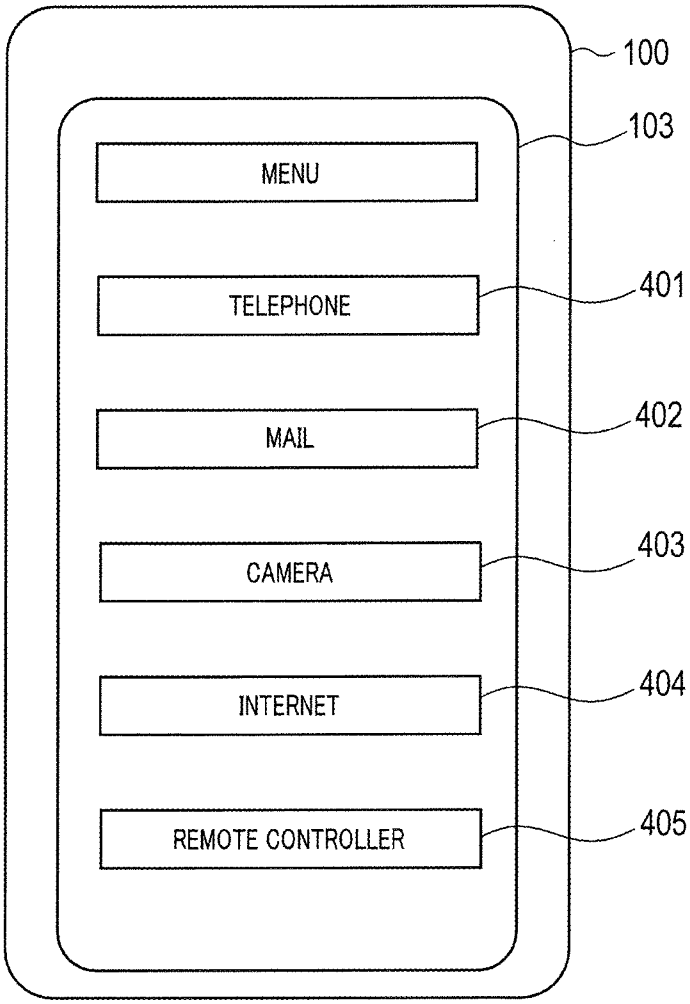
FIG. 5 illustrates an example of a display screen of the smartphone according to the embodiment of the present invention.
Figure 6:
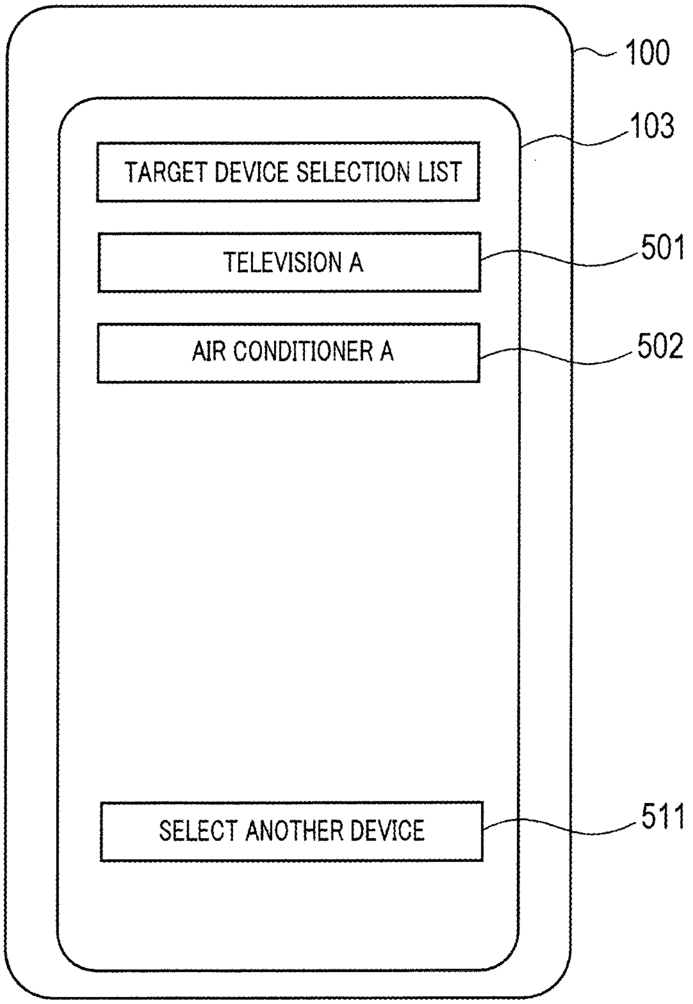
FIG. 6 illustrates another example of the display screen of the smartphone according to the embodiment of the present invention.
Figure 7:
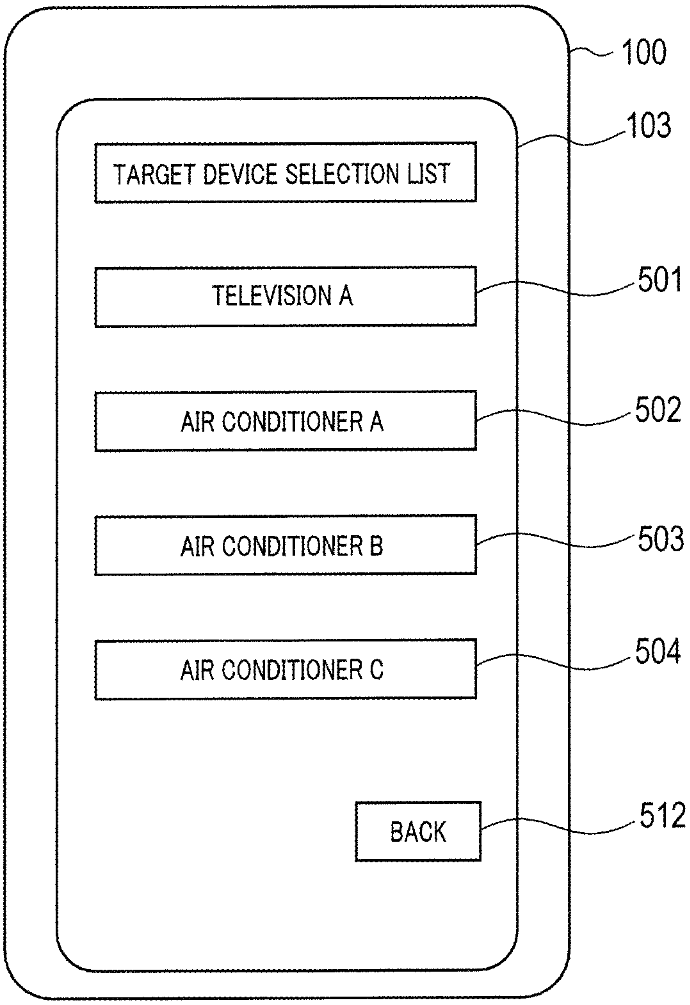
FIG. 7 illustrates another example of the display screen of the smartphone according to the embodiment of the present invention.
Figure 8:
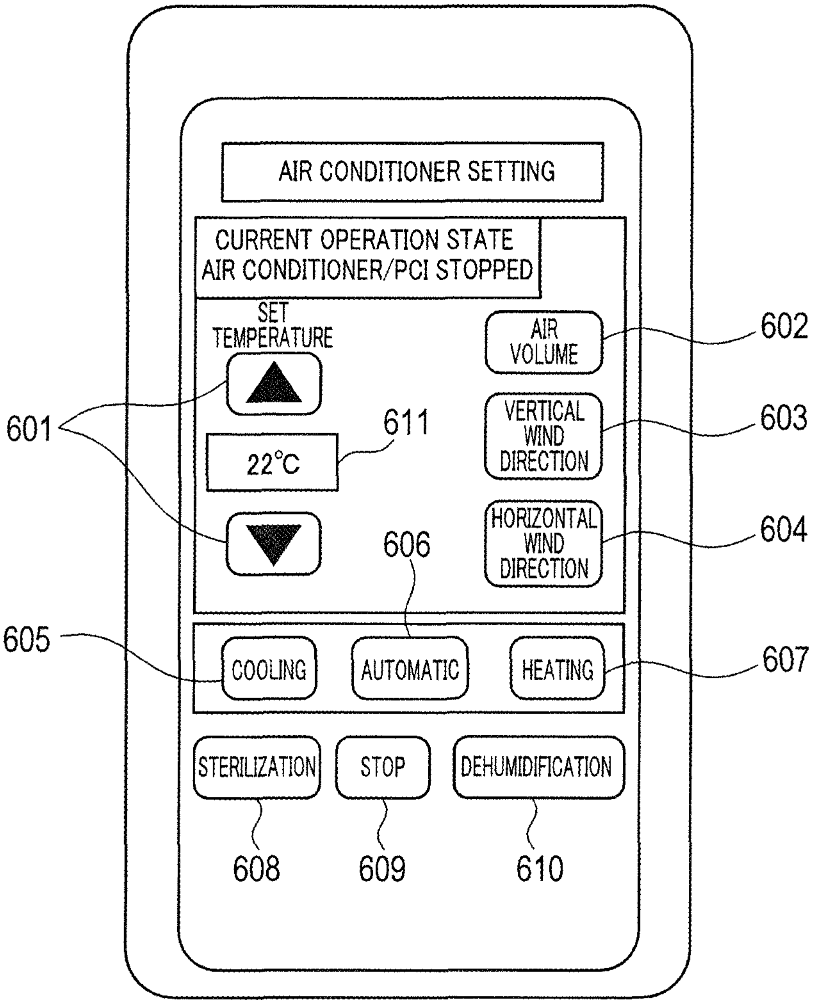
FIG. 8 illustrates still another example of the display screen of the smartphone according to the embodiment of the present invention.

Display control section 304 controls a screen to be displayed on display section 103. More specifically, display control section 304 causes a menu screen including menu buttons of various functions as shown in FIG. 5 to be displayed as an initial screen. Upon receiving information indicating controlled device 200 from ID detection section 303, display control section 304 causes a menu screen including menu buttons indicating all controlled devices 200 whose ID information is detected to be displayed as shown in FIG. 6 and FIG. 7. Upon receiving an electric signal specifying controlled device 200 from indication content analysis section 301, control section 304 causes a screen for operating controlled device 200 to be displayed. For example, when specified controlled device 200 is air conditioner 200-1, control section 304 causes menu buttons and icons similar to those of the remote controller of the air conditioner as shown in FIG. 8 to be displayed.

Upon receiving an electric signal indicating an indication content to control operation target controlled device 200 from indication content analysis section 301, signal generation section 305 outputs ID information of operation target controlled device 200 outputted from ID detection section 303 and a control signal including information indicating control contents to modulator 361 of radio communication section 109.

Antenna 351 receives a radio signal transmitted from each controlled device 200 and outputs the radio signal to mixer 352. Antenna 351 transmits a radio signal outputted from mixer 364 and amplified by an amplifier (not shown) to controlled device 200.

Mixer 352 mixes the radio signal received by antenna 351 and amplified by an amplifier (not shown) with a local signal from frequency synthesizer 353, generates an analog signal of an intermediate frequency (IF) and outputs the analog signal to A/D converter 354.

Frequency synthesizer 353 outputs a local signal of a frequency based on an indication from reception frequency indicating section 302 to mixer 352.

A/D converter 354 converts the analog signal outputted from mixer 352 to a digital signal and outputs the digital signal to demodulator 355. Demodulator 355 decodes the digital signal outputted from A/D converter 354 and outputs the decoded digital signal to ID detection section 303.

Modulator 361 modulates a control signal outputted from signal generation section 305 and outputs the modulated control signal to D/A converter 362. D/A converter 362 converts the digital signal outputted from modulator 361 to an analog signal and outputs the analog signal to mixer 364.

Frequency synthesizer 363 outputs a local signal of a frequency based on an indication from reception frequency indicating section 302 to mixer 364.

Mixer 364 mixes the analog signal outputted from D/A converter 362 with the local signal from frequency synthesizer 363, generates a radio signal, and outputs the radio signal to antenna 351.

Next, examples of a screen of display section 103 of smartphone 100 according to the present embodiment will be described with reference to FIG. 5 to FIG. 8.

FIG. 5 illustrates an example of a menu screen including menu buttons of various functions provided for smartphone 100. The example in FIG. 5 shows telephone menu button 401, mail menu button 402, camera menu button 403, Internet menu button 404, and remote controller menu button 405. When the user touches one menu button in this condition, the corresponding function is executed and the screen of display section 103 changes.

In FIG. 5, when the user touches remote controller menu button 405, smartphone 100 demodulates a signal from each controlled device 200 at a first frequency and detects ID information. Smartphone 100 causes a menu screen including menu buttons indicating all controlled devices 200 whose ID information has been detected to be displayed as shown in FIG. 6.

Here, it is a characteristic of a radio signal that the higher its frequency, the shorter its communication distance becomes. It is only a first signal having a first frequency (5 GHz) which is higher than a predetermined threshold from controlled device 200 (air conditioner 200-1, television 200-4) located in the same room as smartphone 100 that reaches smartphone 100 with sufficient radio field strength.

Therefore, the example in FIG. 6 displays only menu button (television A) 501 indicating television 200-4 and menu button (air conditioner A) 502 indicating air conditioner 200-1 as a target device selection list. The example in FIG. 6 also displays menu button 511 “Select other devices” to allow the user to select other controlled device 200.

In FIG. 6, when the user touches menu button 511 “Select other devices,” smartphone 100 demodulates a signal from each controlled device 200 at a second frequency to detect ID information. Smartphone 100 causes a menu screen including menu buttons indicating all controlled devices 200 whose ID information has been detected to be displayed as shown in FIG. 7.

Second signals having a second frequency (920 MHz) which is lower than a predetermined threshold from all controlled devices 200 in the household (air conditioners 200-1, 200-2, 200-3 and television 200-4) reach smartphone 100 with sufficient radio field strength.

Therefore, the example in FIG. 7 displays menu button (television A) 501, menu button (air conditioner A) 502, menu button (air conditioner B) 503 indicating air conditioner 200-2 and menu button (air conditioner C) 504 indicating air conditioner 200-3 as a target device selection list.

In FIG. 6 or FIG. 7, when the user touches menu button 502 "air conditioner A," smartphone 100 causes menu buttons and icons similar to those of a remote controller of an air conditioner as shown in FIG. 8 to be displayed. In FIG. 7, when the user touches menu button 512 "Back," the screen of smartphone 100 is returned to that in FIG. 5.

In the example in FIG. 8, the screen is provided with set temperature adjustment button 601, air volume control button 602, vertical wind direction button 603, horizontal wind direction button 604, cooling button 605, automatic operation button 606, heating button 607, sterilization button 608, stop button 609, and dehumidification button 610. Temperature display section 611 displays a current set temperature.

In most cases, controlled devices 200 operated by the user are items in front of the user, that is, items that are located in the same room. Smartphone 100 receives a first signal having a first frequency (5 GHz) first, and can thereby display only controlled device 200 that is more likely to be selected as an operation target. Therefore, the user can also simplify the operation of selecting an operation target from among a plurality of controlled devices 200.

Figure 9:
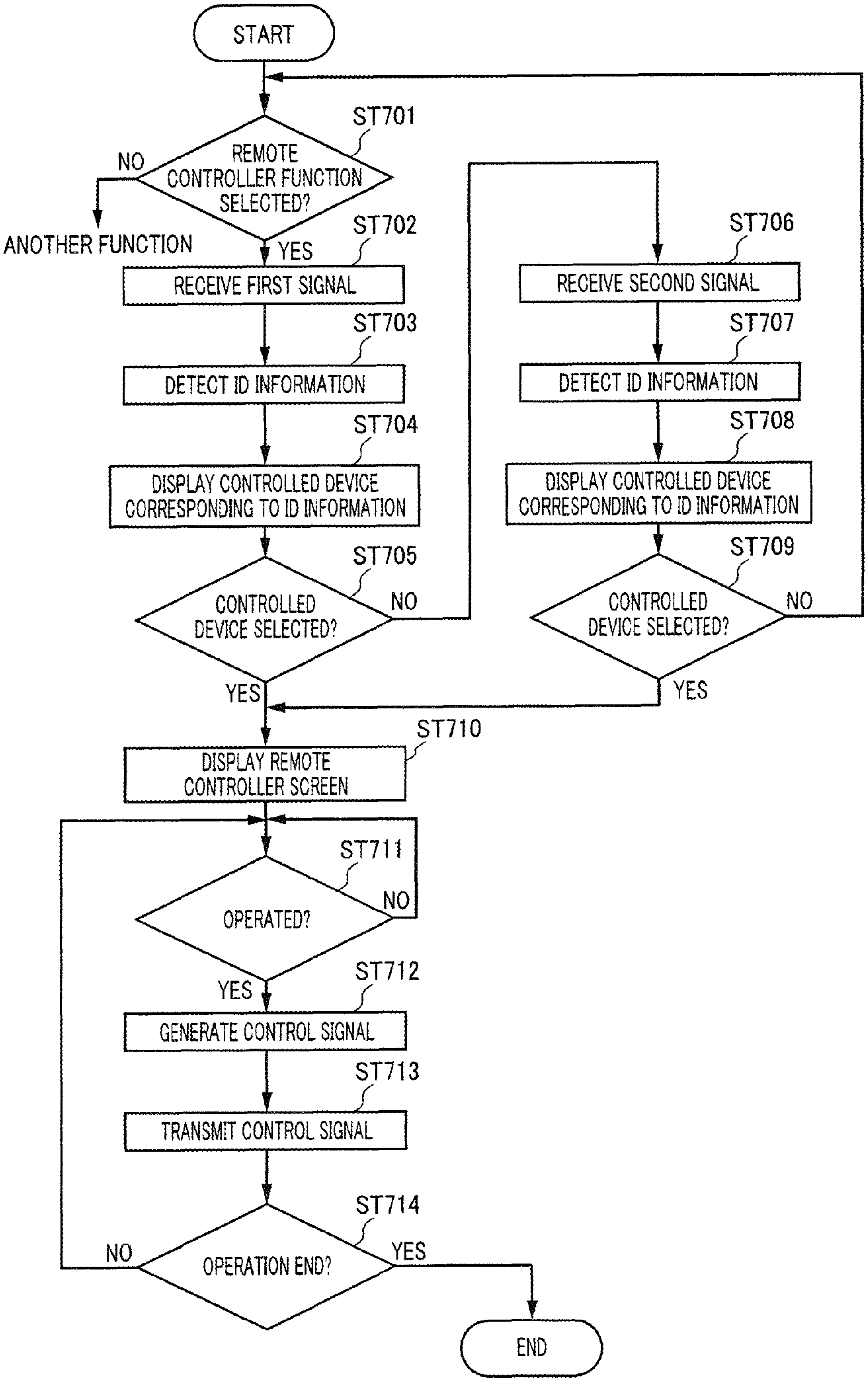
FIG. 9 is a flowchart illustrating operation of the smartphone according to the embodiment of the present invention.

Next, operation of smartphone 100 will be described with reference to FIG. 9. At the start in FIG. 9, an assumption is made that display section 103 of smartphone 100 shows the screen in FIG. 5.

When the user touches remote controller menu button 405 from the menu in FIG. 5 (ST701: YES), smartphone 100 receives a first signal transmitted from each controlled device 200 at a first frequency (ST702), and detects ID information (ST703). Smartphone 100 causes a menu screen including menu buttons indicating all controlled devices 200 corresponding to the detected ID information to be displayed as shown in FIG. 6 (ST704). When the user touches any menu button other than remote controller menu button 405 from the menu in FIG. 5 (ST701: NO), smartphone 100 executes the other function.

After that, when the user touches a menu button indicating one controlled device 200 (ST705: YES), smartphone 100 causes menu buttons and icons similar to those of the remote controller of selected controlled device 200 to be displayed as shown in FIG. 8 (ST710).

On the other hand, when the user touches menu button 511 "Select another device" without touching the menu button indicating controlled device 200 (ST705: NO), smartphone 100 receives a second signal transmitted from each controlled device 200 at a second frequency (ST706) and detects ID information (ST707). Smartphone 100 causes the menu screen including menu buttons indicating all controlled devices 200 corresponding to the detected ID information to be displayed as shown in FIG. 7 (ST708).

After that, when the user touches a menu button indicating any one of controlled devices 200 (ST709: YES), smartphone 100 causes menu buttons and icons similar to those of the remote controller of selected controlled device 200 to be displayed as shown in FIG. 8 (ST710). When the user touches menu button 512 "Back" (ST709: NO), smartphone 100 causes the screen in FIG. 5 to be displayed (returns to ST701).

In ST710, upon receiving the operation of controlled device 200 from the user (ST711: YES), smartphone 100 generates a control signal indicating operation contents (ST712), and transmits the control signal to controlled device 200 (ST713). Hereafter, smartphone 100 repeats processes from ST711 to ST713 until the user ends the operation (ST714).

As described above, according to the present embodiment, demodulating radio signals in descending order of frequencies, when a plurality of controlled devices are controlled by one information device, makes it possible to simplify the operation of the user in selecting a device to be operated from among a plurality of controlled devices without causing any increase in the cost of the information device.

In the above-described embodiment, transmitting a first signal and a second signal at a random timing from each controlled device 200 makes it possible to reduce the probability of collision between first signals or between second signals.

A case has been described in the above-described embodiment where each controlled device 200 transmits two types of radio signals of different frequencies (first signal and second signal), but the present invention is not limited to this, and controlled device 200 may transmit three or more types of radio signals. In this case, smartphone 100 demodulates radio signals in descending order of frequencies. The present invention may also use parameters indicative of distance-dependent radio wave characteristics in addition to frequency. Such parameters are, for example, transmission rate and electric field strength. Smartphone 100 demodulates radio signals in descending order of parameters indicative of distance-dependent radio wave characteristics. For example, when the parameter is a transmission rate, smartphone 100 demodulates a radio signal having the highest transmission rate first. On the other hand, when the parameter is electric field strength, smartphone 100 demodulates a radio signal having the lowest electric field strength first.

The disclosure of the specification, drawings, and abstract in Japanese Patent Application No. 2013-050504 filed on Mar. 13, 2013 is incorporated herein by reference in its entirety.

INDUSTRIAL APPLICABILITY

The present invention is suitable for use in a radio communication system that controls a plurality of controlled devices using a single information device.

REFERENCE SIGNS LIST

100 Smartphone
101 Control section
103 Display section
104 Operation section
109 Radio communication section
200 Controlled device
200-1, 200-2, 200-3 Air conditioner
200-4 Television
201 Control section
202 Radio communication section
301 Indication content analysis section
302 Reception frequency indicating section
303 ID detection section

304 Display control section
305 Signal generation section
351 Antenna
352 Mixer
353 Frequency synthesizer
354 A/D converter
355 Demodulator
361 Modulator
362 D/A converter
363 Frequency synthesizer
364 Mixer

The invention claimed is:

1. An information device that performs radio communication with a plurality of controlled devices and that controls a specified controlled device, the information device comprising:

a parameter indicating section that indicates a radio signal to be demodulated;

a radio communication section that receives a plurality of radio signals having different parameters indicative of distance-dependent radio wave characteristics from the respective controlled devices and that demodulates the indicated radio signal;

an ID detection section that detects ID information included in the demodulated radio signal; and a display control section that causes the controlled device corresponding to the ID information to be displayed on a screen, wherein the parameter indicating section indicates that the radio signals are to be demodulated in descending order of the parameters indicative of the distance-dependent radio wave characteristics.

2. The information device according to claim 1, wherein:

the parameter is a frequency; and the parameter indicating section indicates that the radio signals are to be demodulated in descending order of frequencies.

3. The information device according to claim 1, wherein:

the parameter is a transmission rate; and the parameter indicating section indicates that the radio signals are to be demodulated in descending order of transmission rates.

4. The information device according to claim 1, wherein:

the parameter is an electric field strength; and the parameter indicating section indicates that the radio signals are to be demodulated in ascending order of electric field strengths.

5. The information device according to claim 1, wherein, when instructed from a user to select another controlled device while the controlled device is displayed on a screen, the parameter indicating section indicates the next radio signal to be demodulated.

6. A controlled device that transmits a plurality of radio signals having different parameters of distance-dependent radio wave characteristics to the information device according to claim 1.

7. A radio communication system comprising:

a plurality of controlled devices that transmit a plurality of radio signals having different parameters indicative of distance-dependent radio wave characteristics; and an information device that performs radio communication with the plurality of controlled devices and that controls a specified controlled device, wherein the information device demodulates the radio signals in descending order of the parameters indicative of the distance-dependent radio wave characteristics and causes the controlled device corresponding to ID information included in the demodulated radio signal to be displayed on a screen.

8. A controlled device selection method in an information device that performs radio communication with a plurality of controlled devices and that controls a specified controlled device, the method comprising:

indicating that radio signals to be demodulated are demodulated in such a way that the radio signals are demodulated in descending order of parameters indicative of distance-dependent radio wave characteristics;

receiving a plurality of radio signals having different parameters indicative of distance-dependent radio wave characteristics from the respective controlled devices and demodulating the indicated radio signal;

detecting ID information included in the demodulated radio signal; and causing the controlled device corresponding to the ID information to be displayed on a screen.

* * * * *